United States Patent [19]

Asghar et al.

[11] Patent Number: 5,630,165
[45] Date of Patent: May 13, 1997

[54] SERVO SYSTEM CONTROLLED BY MASTER AND SECOND PROCESSORS THROUGH MEMORY BEING ACCESSED FOR READ AND WRITE BY PROCESSORS IN SEPARATE PORTIONS RESPECTIVELY

[75] Inventors: Saf Asghar; Brett Stewart, both of Austin, Tex.

[73] Assignee: Advanced Micro Devices, Inc., Sunnyvale, Calif.

[21] Appl. No.: 673,317

[22] Filed: Jun. 28, 1996

Related U.S. Application Data

[63] Continuation of Ser. No. 400,498, Mar. 8, 1995, abandoned, which is a continuation of Ser. No. 983,477, Dec. 3, 1992, abandoned.

[51] Int. Cl.$^6$ ........................................... G06F 19/00
[52] U.S. Cl. .................. 395/800; 395/182.11; 395/474; 395/427
[58] Field of Search ...................... 395/200.08, 182.11, 395/427, 474, 800, 727

[56] References Cited

U.S. PATENT DOCUMENTS

| | | | |
|---|---|---|---|
| 4,665,482 | 5/1987 | Murray, Jr. et al. | 395/842 |
| 4,760,521 | 7/1988 | Rehwald et al. | 395/433 |
| 4,862,354 | 8/1989 | Fiacconi et al. | 395/200.06 |
| 4,873,476 | 10/1989 | Kurakake et al. | 395/95 |
| 4,879,642 | 11/1989 | Malka et al. | 364/131 |
| 4,965,717 | 10/1990 | Cutts, Jr. et al. | 395/182 |
| 4,970,447 | 11/1990 | Kamiguchi et al. | 318/567 |

(List continued on next page.)

FOREIGN PATENT DOCUMENTS

| | | |
|---|---|---|
| 0156921 | 10/1985 | European Pat. Off. . |
| 0218036 | 4/1987 | European Pat. Off. . |
| 0368655 | 5/1990 | European Pat. Off. . |
| 0376003 | 7/1990 | European Pat. Off. . |
| 2256290 | 12/1992 | United Kingdom . |
| 88/02149 | 3/1988 | WIPO . |

OTHER PUBLICATIONS

M. Al–Mouhamed, "Multiprocessor System for Realtime Robotics Applications'", Microprocessors and Microsystems, vol. 14, No. 5, Jun. 1990, pp. 276–290.

M. Kircanski et al., "Multiprocessor Control System for Industrial Robots", Robotics and Computer Integrated Manufacturig, vol. 8, No. 2, 1991, pp. 77–82.

M. Kametani et al., "Design Concept for a Robot Controller", Manufacturing Technology International, 1991, pp. 255–256, 258, 260.

J. I. Robla et al., "Hierarchical Architecture for Control System with Robots", Eusipco–88 Proceedings IV; Theories and Applications, vol. 2, Sep. 5–8, 1988, pp. 623–626.

"Multiple Digital Signal Processor Circuit Cards for Tool Control", IBM Technical Disclosure Bullentin, vol. 32, No. 5A, Oct. 1989, pp. 452–454.

Fast Access Control of the Head Positioning Using A Digital Signal Processor, S. Hasegawa et al, SPIE vol. 1248 Storage and Retrival Systems and Applications (1990) pp. 104–113.

*Primary Examiner*—Thomas C. Lee
*Assistant Examiner*—Moustafa Mohamed Meky
*Attorney, Agent, or Firm*—Foley & Lardner

[57] ABSTRACT

A servo loop control apparatus having a master microprocessor and at least one autonomous streamlined signal processor is disclosed. The architecture provides a general purpose controller for use in systems where intensive servo signal processing is required and is well suited to applications where multiple servo control loops operate simultaneously. The operation of the streamlined signal processors is autonomous from the master processor so that critical functions can be dedicated to the streamlined signal processors. This eliminates complex interrupt management and tedious real time scheduling constraints, simplifies system design and improves system performance. The architecture provides an integrated mechanism for implementing multiple, concurrent, complex signal processing and embedded control functions, such as complete servo-mechanism management for high performance disk storage systems.

22 Claims, 7 Drawing Sheets

U.S. PATENT DOCUMENTS

| | | | |
|---|---|---|---|
| 5,038,276 | 8/1991 | Bozzetti et al. | 395/550 |
| 5,072,373 | 12/1991 | Dann | 395/200.08 |
| 5,127,089 | 6/1992 | Gay et al. | 395/288 |
| 5,136,714 | 8/1992 | Brandaway | 395/733 |
| 5,142,683 | 8/1992 | Burkhardt, Jr. et al. | 395/733 |
| 5,142,689 | 8/1992 | Eisenack | 395/800 |
| 5,146,596 | 9/1992 | Whittaker et al. | 395/296 |
| 5,161,209 | 11/1992 | Nagai et al. | 318/568.1 |
| 5,187,796 | 2/1993 | Wang et al. | 395/800 |
| 5,193,197 | 3/1993 | Thacker | 395/303 |
| 5,202,966 | 4/1993 | Woodson | 395/297 |
| 5,271,020 | 12/1993 | Marisetty | 371/30 |
| 5,319,753 | 6/1994 | MacKenna et al. | 395/868 |

SERVO SYSTEM CONTROLLED BY MASTER AND SECOND PROCESSORS THROUGH MEMORY BEING ACCESSED FOR READ AND WRITE BY PROCESSORS IN SEPARATE PORTIONS RESPECTIVELY

This application is a continuation of application Ser. No. 08/400,498, filed Mar. 8, 1995, now abandoned, which is a continuation of application Ser. No. 07/983,477, filed Dec. 3, 1992, now abandoned.

BACKGROUND OF THE INVENTION

1. Field of the Invention

The invention pertains generally to systems accomplishing motion control through servo mechanisms and, in particular, to systems requiring intensive signal processing such as those having multiple servo loops operating simultaneously.

2. Related Art

Digital signal processors have found use in servo control loop applications. Such micro processors are used to accomplish system management, to control parameter sampling, to execute servo position and tracking control, to perform complex calculations required for various control functions and to perform other related tasks. For example, Hasegawa, et al in "Fast Access Control of the Head Positioning Using A Digital Signal Processor" SPIE Vol. 1248, Storage Retrieval Systems and Applications (1990) p. 104, discloses the use of a digital signal processor for positioning the head of a storage and retrieval system. In conventional systems it has been necessary to multitask several servo loops through a single signal processor using, for example, complex priority-based interrupt schemes. For example, a calculation routine could be interrupted to permit servicing of a higher priority control device. As a result, multiple, concurrent complex signal processing and imbedded control functions have been difficult to implement.

In particular, servo requirements of high performance optical discs are among the more difficult of any storage system. Such optical discs require a number of complex control mechanisms. These include mechanisms for system management, control of a focus servo, and control of servos used for coarse and fine track positioning. In addition, it is necessary to provide control for a read and write laser power servo, spindle rotation control, field magnet control, and the ability to execute complex algorithms, such as seek algorithms. Such a magneto optic servo system requires high time precision and value precision analog sampling, fast servo calculation time and the flexibility to control several loops simultaneously, while allowing a wide dynamic range of adjustment of the parameters of the several servo loops.

Conventional approaches which multi-task several servo loops through a digital signal processor become bogged down in tedious real-time scheduling constraints. As performance requirements on such systems become more stringent, the need to improve the capability of the digital signal processing becomes apparent. This applies generally to all servo control loops and is not merely limited to the requirements of optical disc storage and retrieval systems.

SUMMARY AND OBJECTS OF THE INVENTION

In view of the real-time scheduling constraints imposed on microprocessors used to control multiple complex servo loops in emerging systems, it is an object of the invention to provide a simplified system in which such real-time scheduling constraints are minimized and system design is simplified.

The above and other objects of the invention are accomplished by a system which includes a general purpose microprocessor and one or more streamlined signal processors to which critical functions can be dedicated. An important underlying concept is that the streamlined signal processors may be intruded upon only when in the idle state or under very specific previously-defined conditions.

A servo loop control apparatus according to the invention includes input circuitry receiving signals from a servo loop to be controlled and output circuitry providing signals to the controlled servo loop. A master processor controls the apparatus and, in a first embodiment of the invention, is connected to an input/output bus arbiter. A second processor operates autonomously of the master processor and is dedicated to specific, pre-programmed servo loop control tasks. The second processor is also connected to the input/output bus arbiter. The input/output bus arbiter controls access to the input circuitry and the output circuitry by the master processor and the second processor. The second processor includes means, such as an execution processor, for executing repetitive preprogrammed servo loop processing instructions without interruption, thereby maintaining operation of a servo loop independent of the master program. A second embodiment uses a RAM based access scheme. The servo control apparatus of the invention can also include vector registers, which provide a means for interrupting servo loop processing in the second processor under a limited set of predefined conditions.

The servo control or motion control apparatus according to the invention also can include an instruction RAM for access by the second processor. This instruction RAM can be used to store instructions for user defined servo control loop routines. It is also possible to include an instruction ROM for access by the second processor, with the instruction ROM storing instructions for predefined turn-key routines typically used in controlling a servo loop. A memory accessible by the second processor while executing instruction can be included for storing commonly accessed subroutines and variable parameters used by the user defined routines and the turn-key routines.

A third processor can also be included. Tasks can be divided between the second and third processors. For example, the second processor can be used to handle regularly scheduled or repetitive tasks, while the third processor is interruptable to handle asynchronous servo loop events.

The servo or motion control apparatus according to the invention can also have polling input and output circuitry to assure fresh data is supplied to the processors, high speed or flash analog to digital and digital to analog converters, pulse width modulated outputs or other outputs suitable for controlling particular devices in a servo loop. Safety features can also be incorporated, such as window comparators to cause shutdown of controlled apparatus when predetermined parameter ranges are not maintained.

BRIEF DESCRIPTION OF THE DRAWINGS

The above and other objects of the invention are achieved by a system described herein with reference to the drawings in which:

FIG. 5b illustrates a driver connectable to the pulse width modulation circuit shown in FIG. 5a;

DETAILED DESCRIPTION OF THE PREFERRED EMBODIMENTS

Figure 1A:
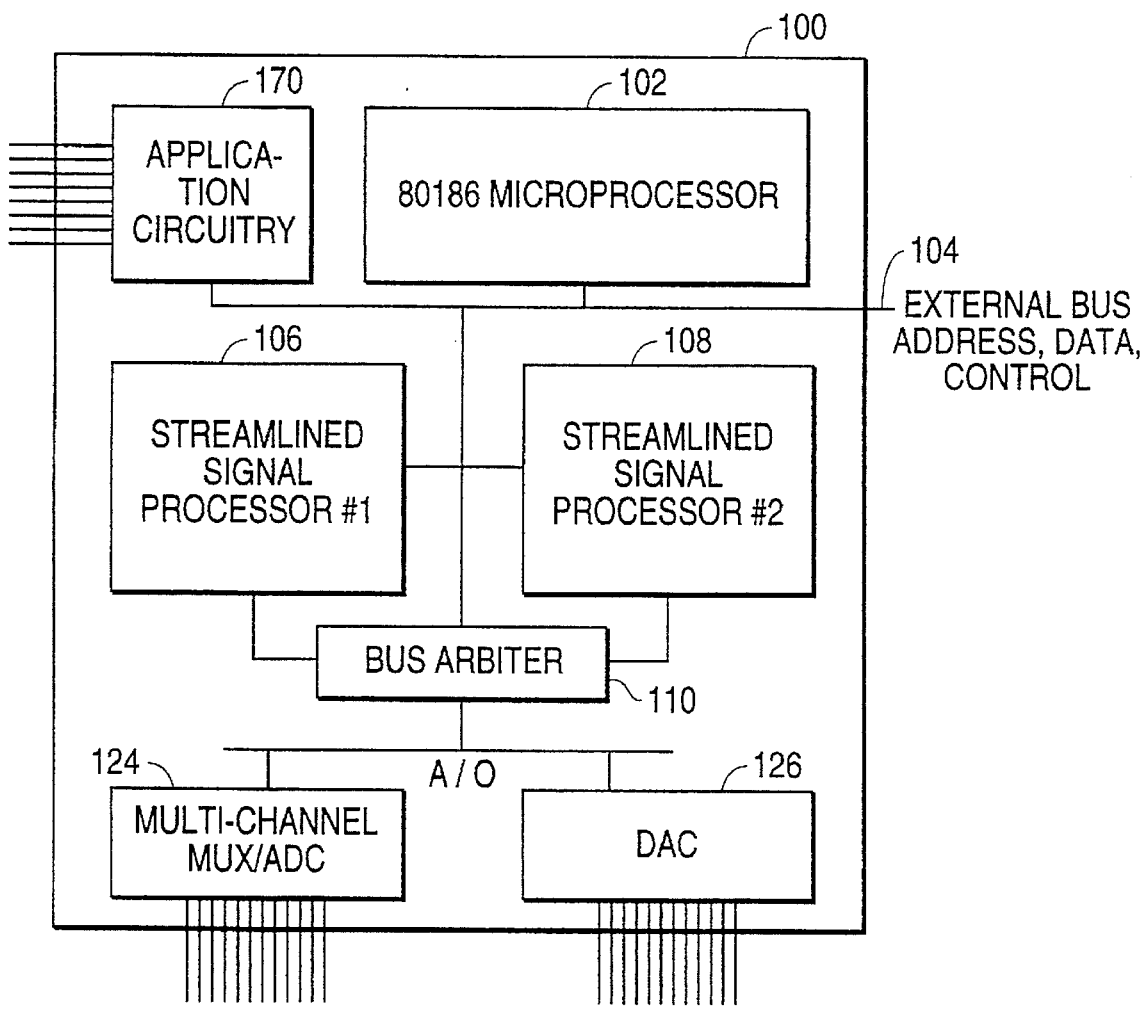
FIG. 1a is a simplified block diagram of a servo or motion controller architecture according to the invention.
Figure 1B:
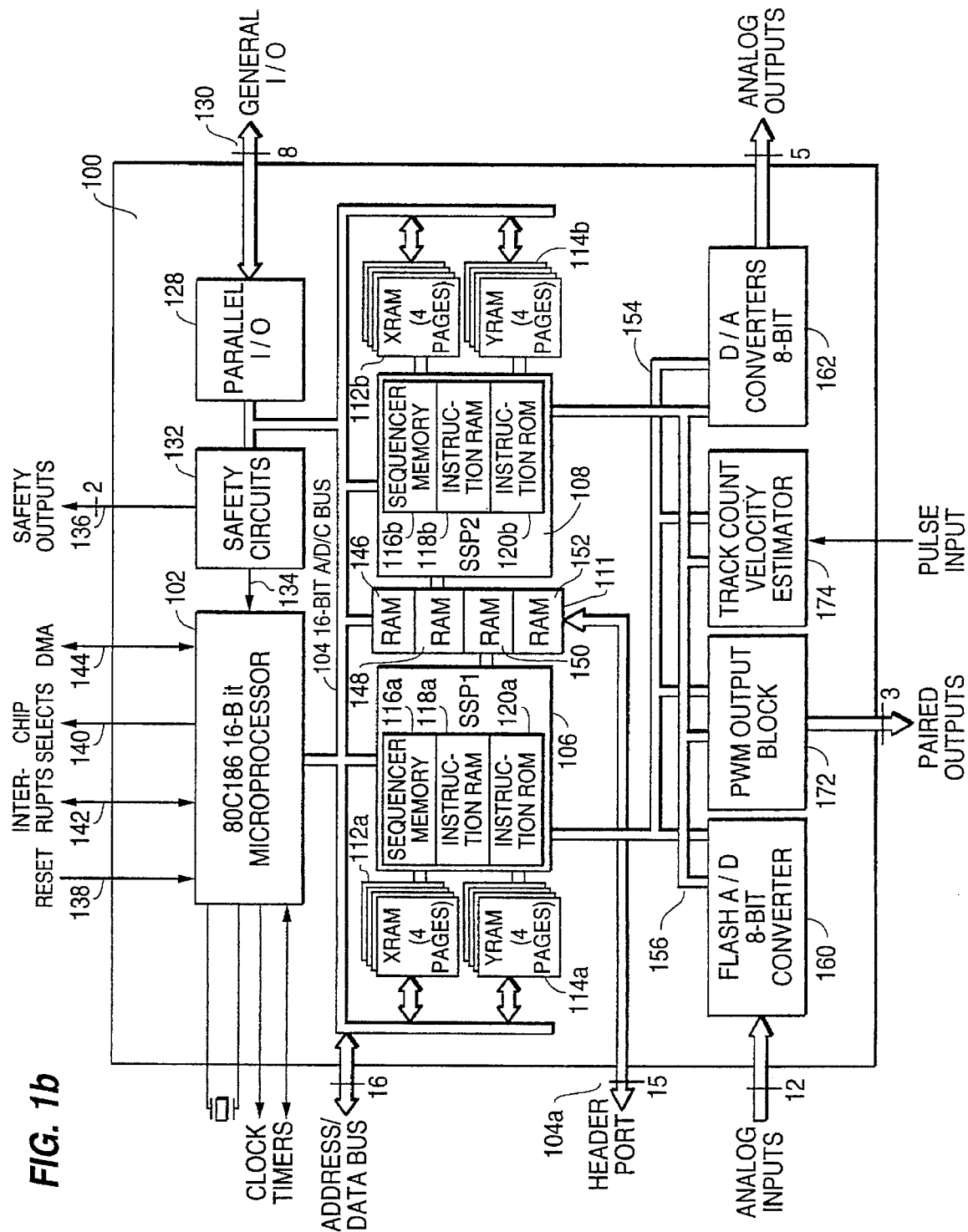
FIG. 1b is a detailed block diagram of a servo or motion controller according to another embodiment the invention.

A device incorporating a motion control or servo control architecture according to the invention is shown generally at 100 in simplified block diagram 1a and the more detailed block diagram of another embodiment in FIG. 1b. The apparatus in FIG. 1a contains a master microprocessor 102, for example an 80186 or 80C186 16-bit microprocessor, connected over data bus 104 providing address and data information to first and second streamlined signal processors 106 and 108 and bus arbiter 110. Bus 104 also transmits control information. The block diagram of the second embodiment in FIG. 1b shows bus 104a connected to a header port discussed further herein.

Each streamlined signal processor 106, 108 is a microprogrammable processor which includes sequencer memory, instruction memory and an execution unit. It will be known to those of ordinary skill that such an execution unit would include an arithmetic logic unit, registers and related processing devices. Such a device could be programmed with microcode. Each streamlined signal processor performs programmed tasks related to servo loop control. The streamlined signal processors are capable of operating multiple servo loops simultaneously at sample rates exceeding 100 kilohertz and have a comprehensive analog and digital input/output capability. The use of a streamlined signal processor in an optical disc control servo loop is discussed further herein, by way of example and not limitation, since other applications are also possible. An important principle underlying the architecture and operation of the servo loop control apparatus of the invention is that a streamlined signal processor may be intruded on only when it is in the idle state, except under specific predefined conditions. After being dynamically loaded with their programs at power up, the streamlined signal processors 106, 108 operate autonomously. During their autonomous operation, bus arbiter 110 keeps traffic unrelated to maintaining servo loops from slowing servo operations. Thus, one streamlined signal processor is unaffected by data exchanges between the master microprocessor 102 and the other streamlined signal processor.

Streamlined signal processors 106 and 108 obtain access to an analog input/output bus 122 through bus arbiter 110. Analog inputs are obtained through Multi-Channel MC/ADC (Analog to Digital Converter) 124. Outputs to control devices are provided through (Digital to Analog Converter/Pulse Width Modulation) DAC/PWM device 126. Through planned timed multiplexing, streamlined signal processors 106 and 108 can share access to analog input/output peripherals without collision. However, access to the analog input/output bus by either the central processor 102, or streamlined signal processors 106 and 108 is controlled by bus arbiter 110. Arbiter 110 can be programmed to give either of the streamlined signal processors priority of access to analog IO bus 122 during colliding access requests. The lowest priority of access to the analog IO bus 122 is assigned to the entity (processor 102, streamlined signal processor 106, streamlined processor 108) which has control of the address data control bus 104. This is because that entity can disable the streamlined signal processor while it accesses the analog IO bus 122. When an access collision occurs between two streamlined signal processors contending for the analog IO bus 122, bus arbiter 110 awards the bus to the streamlined signal processor with a higher predetermined priority, as programmed. The other streamlined signal processor remains stalled until access to analog IO bus 122 is available. No further bus arbitration takes place and there need be no effort to preserve the synchronicity of access of a higher priority streamlined signal processor. Thus, if a lower priority streamlined signal processor gains access to the analog input/output bus 122 during an interval when a streamlined signal processor with a higher predetermined priority would have accessed the analog IO bus 122, the higher priority streamlined signal processor will remain stalled until the lower priority streamlined signal processor completes its input/output operation through multi-channel MCS/AD converter 124 or DAC/PWM 126. Thus, the streamlined signal processor 106,108 can operate autonomously to control multiple servo loops by accessing analog input/output bus 122 through bus arbiter 110, thereby receiving and providing control signals through multi-channel MCS/ADC 124 and DAC/PWM 126.

FIG. 1b is a view of another embodiment of control apparatus 100, employing some of the same elements in FIG. 1a, as indicated by corresponding reference designators. Parallel I/O (input/output) block 128 connects general input/output bus 130 with address/data bus 104 and safety circuits 132. Safety circuits 132 communicate with microprocessor 102 to generate a signal on signal line 134 to microprocessor 102 indicating when a system input has exceeded a programmable range. External outputs 136 are also provided.

Microprocessor 102 is shown in FIG. 1b having a reset input 138 and chip select outputs 140. In addition, microprocessor 102 has interrupt capabilities on signal lines 142 and direct memory access capabilities on signal lines 144.

The streamlined signal processors 106, 108 shown in FIG. 1b each have a sequencer memory 116a, 116b, respectively, instruction RAM 118a, 118b, respectively, and instruction ROM 120a, 120b, respectively. The sequencer memory contains a list of the start addresses of each sequence of instructions stored in the instruction RAM or instruction ROM. The instruction RAM can include sequences of servo loop control instructions programmed by a user. The instruction ROM 120a, 120b would include preprogrammed instructions to carry out "turnkey" operations, such as those associated with an infinite impulse response filter or other servo loop control apparatus, as discussed herein.

Each streamlined signal processor 106, 108 has associated with it paged random access memories XRAM 112a, 112b, respectively, and YRAM 114a and 114b, respectively. The XRAM and YRAM share the same address space from the point of view of streamlined signal processors 106, 108. This allows a high degree of parallelism in the streamlined signal processor structure, since both the XRAM and YRAM can be accessed simultaneously. The use of the paged XRAM and YRAM allows servo control algorithms to share common subroutines. For example, a unique page of memory could be used for each control loop. However, context switching can be performed to allow servo control algorithms to share common subroutines. For instance, each control loop could access a common subroutine used, for example, in a filter.

In FIG. 1b, bus arbiter 110 is eliminated and instead a plurality of contiguous blocks of RAM 111 is shown. RAM block 146 is accessed by microprocessor 102 through bus 104. Streamlined signal processor 108 accesses RAM block 148, streamlined signal processor 106 accesses RAM block 150 and an external controller device connected to the header port accesses RAM block 152 through bus 104a. These four blocks of RAM can be used for transferring information among the four processors in the system, the four processors being microprocessor 102, streamlined signal processor 106, streamlined signal processor 108, and an external processor or controller connected to the header port. A processor can only write data to the corresponding portion of RAM. Thus, microprocessor 102 writes data to RAM block 146, streamlined signal processors 108 and 106 write data to RAM blocks 148 and 150, respectively, and an external controller, such as an optical data channel controller, writes data only to RAM block 152. In this way, write arbitration is maintained without latency and overhead associated with typical bus arbitration logic. All the processors can read all the memory blocks to facilitate transfer of data from one processor to another. Thus, to exchange information between processors, for example, between streamlined signal processor 106 and microprocessor 102, the processor with the information writes its data to its own block of RAM (e.g., streamlined signal processor 106 writes data to RAM block 150) and signals the recipient (microprocessor 102) to read the sender's RAM block (150).

FIG. 1b also shows additional detail concerning the analog inputs and outputs of servo control device 100. Streamlined signal processors 106 and 108 control input/output operations on separate busses 154 and 156, respectively, for example, during predetermined, scheduled time slots according to the process being implemented. One or more analog inputs is applied to flash analog to digital converter 160. Under control of the streamlined signal processors 106, 108, the analog inputs can be sampled sequentially or on command.

On the other hand, in the first embodiment previously discussed, bus arbiter 110 assigns priority to the streamlined signal processor having the highest predetermined programmed priority. A flash converter in multi-channel Mux/ADC 124 is automatically synchronized to the higher priority streamlined signal processor. Priority controls both synchronization as well as arbitration to access of shared resources, for example, registers in the output D to A converters 126.

FIG. 1a also shows application circuitry 170 communicating with the processors on bus 104. Associated with such application-specific logic are pulse width modulation (PWM) block 172 and track count velocity estimator 174 in FIG. 1b, which receive inputs from a disc controller, such as an optical disc controller, in order to estimate radial velocity based on track counts.

Figure 2:
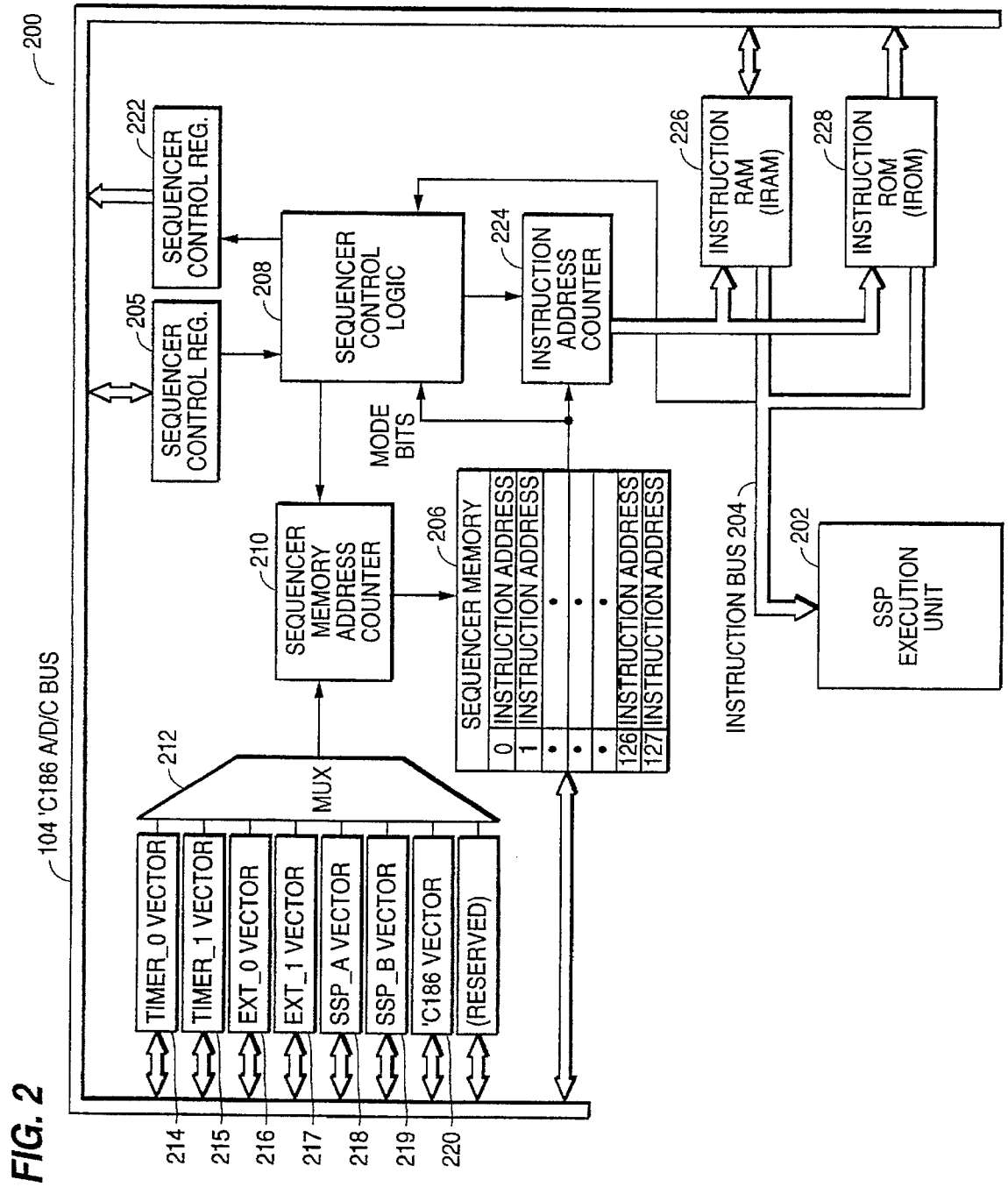
FIG. 2 is a block diagram of a streamlined signal processor used in the motion controller.

FIG. 2 illustrates an example of a streamlined signal processor. Those of ordinary skill will recognize that other streamlined signal processor configurations, which can be formed from generally available processor components, may be employed and that the streamlined signal processor of FIG. 2 is given by way of illustration and not limitation. Streamlined signal processor 200 has a streamlined signal processor execution unit 202 which executes instructions received on instruction bus 204. As previously noted, this streamlined signal processor operates and carries out tasks autonomously. Thus, a user may define as a "frame" a repetitive time period dedicated to a specific task or collection of tasks which is specific to any streamlined signal processor. These "frames" are context specific to a particular streamlined signal processor and need not be the same length of time and need not contain the same tasks as those of any other streamlined signal processor. The tasks accomplished by a streamlined signal processor are controlled by the sequence of instructions executed. The streamlined signal processors must handle synchronous timing loops and asynchronous job requests. Sequence control through microprocessor 102 is accomplished using sequencer control register 205. Sequencer control register 205 selects the sources of signals which trigger the start of a series of streamlined signal processor sequences. A sequence refers to a group of streamlined signal processor instructions which perform a particular task. A series is a list of sequences executed in the order they are stored in the sequencer memory 206.

As previously noted, sequencer control register 205 selects the sources of the signals which trigger the start of a series of streamlined signal processor sequences. The output of the sequencer control register is provided to sequencer control logic 208, which also receives mode bits, discussed further herein, from the sequencer memory 206 and current instruction information from instruction bus 204. The output of sequencer control logic 208 is one of the inputs to memory address counter 210. Memory address counter 210 points to the next sequencer memory address or sequencer slot (0 through 127). Sequencer memory address counter 210 is loaded with the contents of an appropriate vector register depending on how the sequence is to be triggered. This information is received through multiplexer 212 from vector registers 214–220. Registers 214 and 215 trigger the start of a repetitive series used, for example, for sampling-type calculations.

The start/stop points of a repetitive collection of tasks called a series is marked by a frame sync signal used to signal the frame boundaries. As previously noted, frames and frame sync are always context specific to a particular streamlined processor and need not be related in any way to any other streamlined signal processor. Time critical or asynchronous calculations can be triggered using external trigger vectors 216, 217. Each streamlined signal processor can trigger a series on the other streamlined signal processor in order to pass information or share processing power between the two streamlined signal processors using SSP registers 218, 219. Finally, microprocessor 102 can trigger a series in order to monitor and control streamlined signal processor activities through vector register 220. Based on the contents of sequencer control register 206 and sequencer control logic 208 one of these vector addresses can be read into sequencer memory address counter 210 through multiplexer 212.

Sequencer control logic 208 also provides sequence status register 222 with a busy or idle status of the streamlined signal processor 200. In addition, when the streamlined signal processor needs to pass unsolicited information to microprocessor 102 or cause microprocessor 102 to perform a specific task, sequencer status 222 can be used to generate an interrupt.

Vector registers 214–220 allow synchronous or asynchronous triggers to cause the streamlined signal processor to perform a specific function. These triggers are analogous to interrupts. Microprocessor 102 can write to the vector registers via bus 104 at any time.

Triggers are analogous to interrupts and synchronous triggers in vector registers in 214 and 215 cause the streamlined signal processor to take action immediately. Asynchronous triggers in vector registers 216–220 remain pending until the synchronous trigger has been serviced. Since more than one trigger can occur at any time, a priority is assigned to each vector register.

Sequencer memory address counter 210 is loaded at the beginning of a trigger event with the contents of the appropriate vector register. This counter provides a pointer to the next sequencer slot in the sequencer memory to be transferred to the instruction address counter. Mode bits to sequencer control logic 208 define three basic modes of operation: sequential execution, conditional execution and terminal execution. In sequential execution, each sequence listed in the sequencer memory is executed in numerical order. Thus, the sequencer memory address counter is incremented to the next slot after the current sequence completes. Conditional execution allows skipping over sections of the servo code or replacing sections of the servo code with no operation (NOP) instructions to maintain the timing sequence of the servo loop. In either case, the sequencer memory address counter is incremented to the next slot. Terminal execution mode means that the current series of instructions is the last one to be executed by the streamlined signal processor before stopping and entering the idle state. In this case, the sequencer memory address counter 210 is not incremented and the streamlined signal processor enters the idle mode.

Instruction address counter 224 points to the next instruction in the instruction RAM 226 or instruction ROM 228 to be executed. The instruction ROM and instruction RAM contain microcode to be executed by the streamlined signal processor 200. Each streamlined signal processor has a separate instruction ROM and instruction RAM 228, 226, respectively. Special purpose code developed by a user is downloaded to the instruction RAM 226. Microcode for commonly used functions such as filters, oscillators, transformers, and other turnkey functions is stored in instruction RAM 228.

There are several examples of "turnkey" sets of routines which can be stored in instruction ROM to operate with use of programmable coefficients. One is a programmable lead/lag filter and integrator. A flexible filter structure, for example, up to a 2nd-order filter for various control loops can be programmed. Coefficients for different control loops can be loaded from XRAM and YRAM as discussed with respect to FIG. 1b. Higher order filters can be implemented by cascading small 2nd-order filters.

A general structure of a programmable tone generator can be coded in instruction ROM 228 to be shared by various control loops for calibration. The frequency of the tone generator can be selected by programming the coefficient for the corresponding control loop, for example, in XRAM and YRAM.

Other functions can also be implemented in instruction ROM including a recursive averaging filter in which a counter can be programmed to handle long-term or short-term averaging, and a programmable threshold comparator in which the threshold of one shared comparator or several comparators can be set through XRAM or YRAM for different control loops. Mid-size counters can be programmed with longer counters built by cascading such mid-size counters. Linear estimators and special math-function routines such as square roots, divisions, and exponential functions can be coded as sub-routines in instruction RAM 228.

Figure 3:
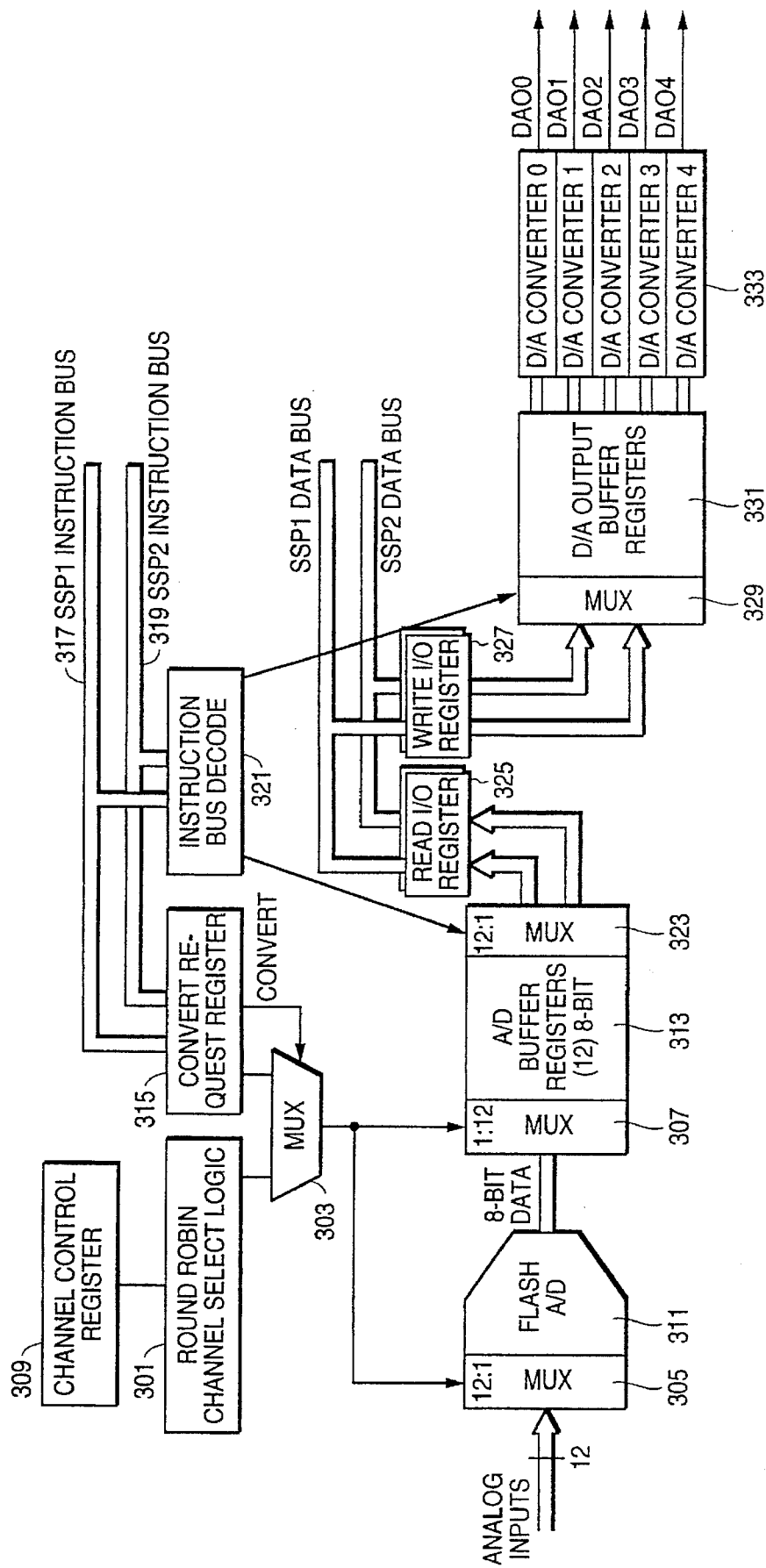
FIG. 3 is a block diagram of an analog interface.

The analog input/output structure is shown in more detail in FIG. 3. The objective of the structure is to activate continuous background sampling to ensure the availability of fresh data to the streamlined signal processors. This is accomplished with round robin channel select logic 301 which, when selected by multiplexer 303 causes multiplexer 303 to activate multiplexers 305 and 307 to select analog inputs for conversion. The channel control register 309 controls the length of the sampling sequence. Each sampled input is applied to flash analog to digital converter 311 for conversion to a digital representation. Multiplexer 307 assures the digital representation is stored in the corresponding one of the analog to digital buffer registers 313.

Round robin sampling can be overridden by a convert request from the convert request register 315. The convert request register is responsive to instructions from the instruction bus 317, 319 corresponding to each of the streamlined signal processors, respectively. The convert command initiates a conversion for a specific channel and has a higher priority than background sampling. Ongoing conversions are interrupted and the output from multiplexer 303 is now taken from convert request register 315. Upon completion of the asynchronous conversion requested by the streamlined signal processor, round robin sequencing continues with the next scheduled channel.

Flash A-D converter 311 is automatically synchronized to the streamlined signal processor with the higher predetermined priority. If either streamlined signal processor is idle, synchronization is tied to the active processor.

Based on instructions from instruction bus decode logic 321, the samples from the A-D buffer registers are transferred via multiplexer 323 under streamlined signal processor control to the read input/output register 325 for use by the appropriate streamlined signal processor. Similarly, the streamlined signal processors write data from a write IO register 327 into one of the digital to analog output buffer registers 331 as instruction bus decode logic 321 instructs multiplexer 329. A bank of digital to analog converters is available to produce analog outputs for use by the controlled system.

Figure 4:
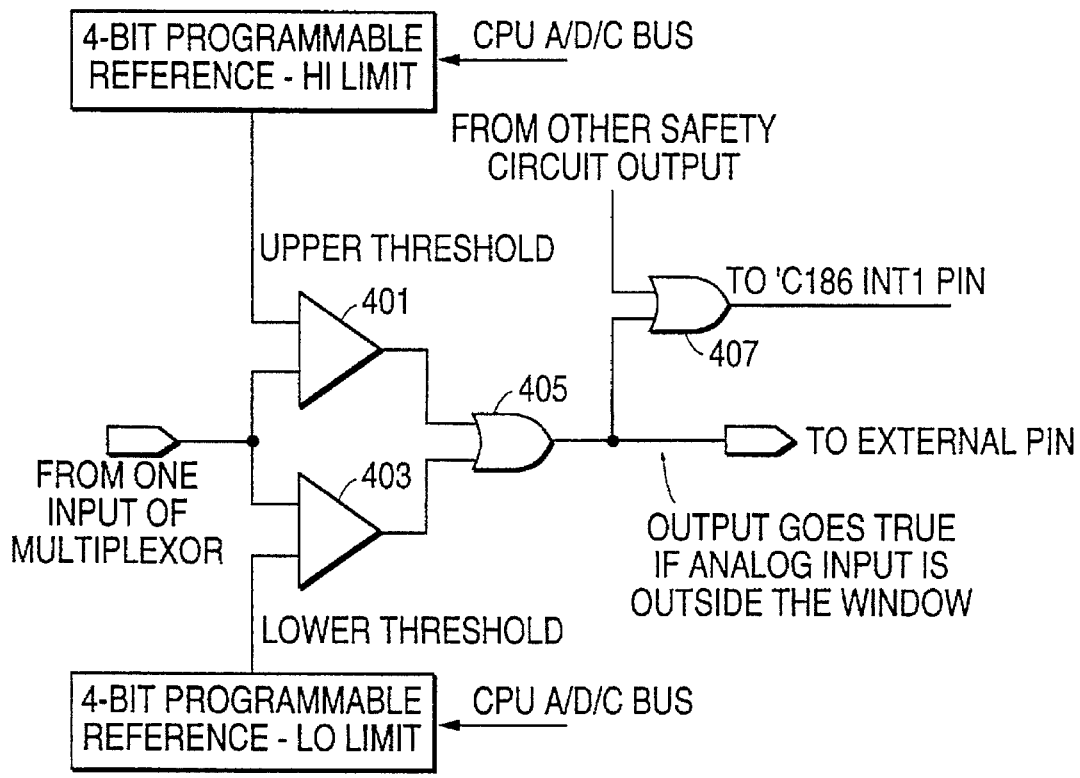
FIG. 4 is a block diagram of a safety circuit used in the servo control apparatus of the invention.

The safety circuits shown in FIG. 1b are illustrated in more detail in FIG. 4. These safety circuits are analog window comparators which generate both an interrupt and an external signal when an input to the system exceeds a programmable range. Thus, comparators 401 and 403 compare an input to a programmable upper threshold and a programmable lower threshold, respectively. If the input is outside the window between the upper and lower thresholds, the output of gate 405 goes true, thereby indicating an out of limit condition. Gate 407 is used to generate a true output when either of two safety circuits is out of tolerance. A typical use of such safety circuits in a servo application would occur in an optical disk controller when focus or track lock is lost, since a rapid reduction of the write laser power to the read power level would occur. Of course, other applications will be know to those of ordinary skill.

Figure 5A:
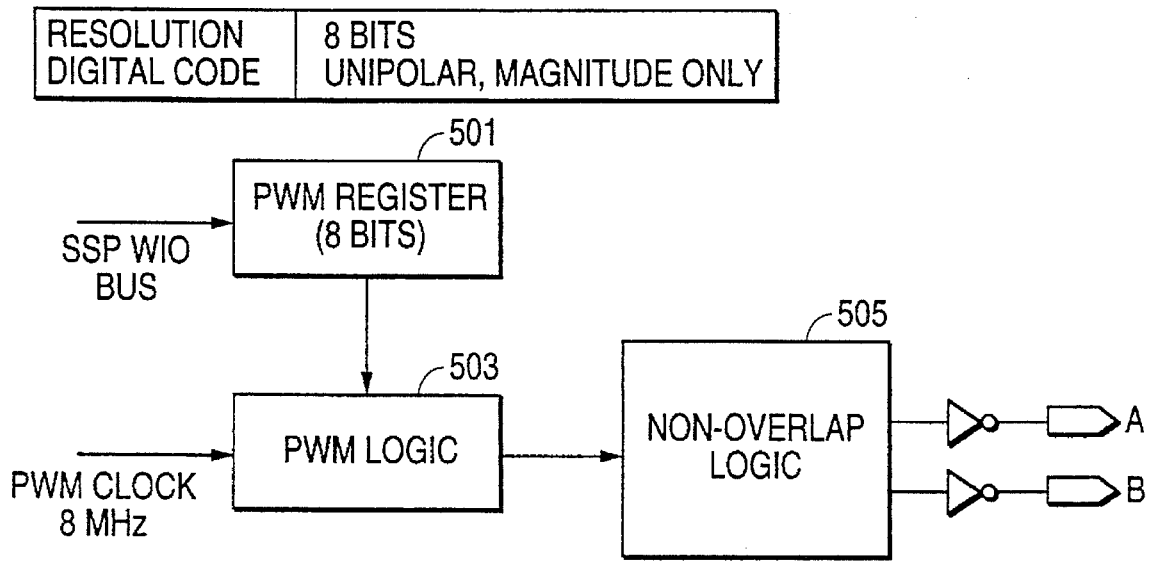
FIG. 5a is a block diagram of a pulse width modulation circuit.
Figure 5B:
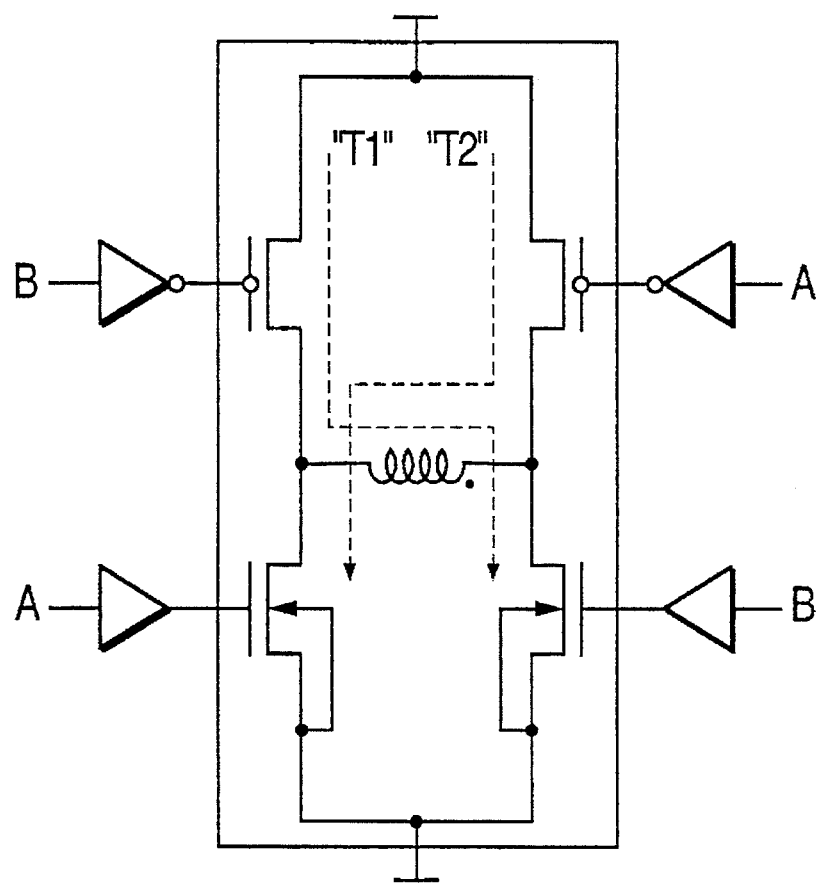
Figure 5C:
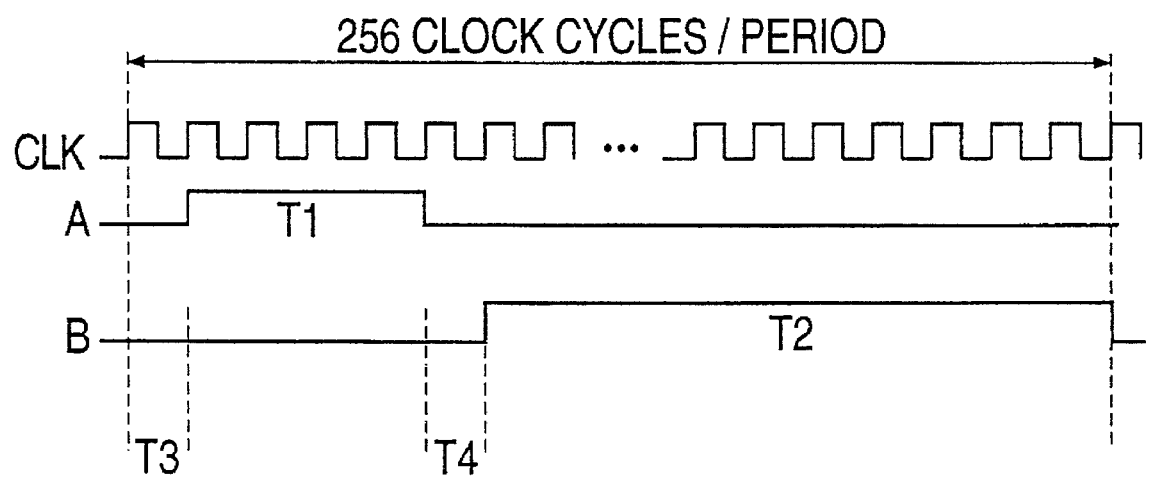
FIG. 5c illustrates pulse width timing.

The use of pulse width modulation techniques in a servo loop control is known. FIG. 5a illustrates generation of pulse width modulation based on pulse width information received from a streamlined signal processor write input/output register 327 into pulse width modulation register 501. The output of pulse width modulation register 501 is supplied to pulse width modulation logic 503 which receives a clock. The output of pulse width modulation logic 503 is provided to non-overlap logic circuit 505 to assure a non-overlap delay time between signals A and B. FIG. 5b illustrates a typical driver connected to a pulse width modulation output, as would be known to those of ordinary skill. FIG. 5c illustrates the pulse width modulation timing.

The above described architecture provides a mechanism to manage displacement-event pulses. Although this is a general capability, it is of particular interest in the application of track-cross counting during optical disk seek operations. Due to high radial velocities of the head/actuator assembly, the problem of accurate track-cross counting can be likened to phase-locking from a noisy DC to 5 MHz, then back down to DC within a 15 ms interval.

Figure 6:
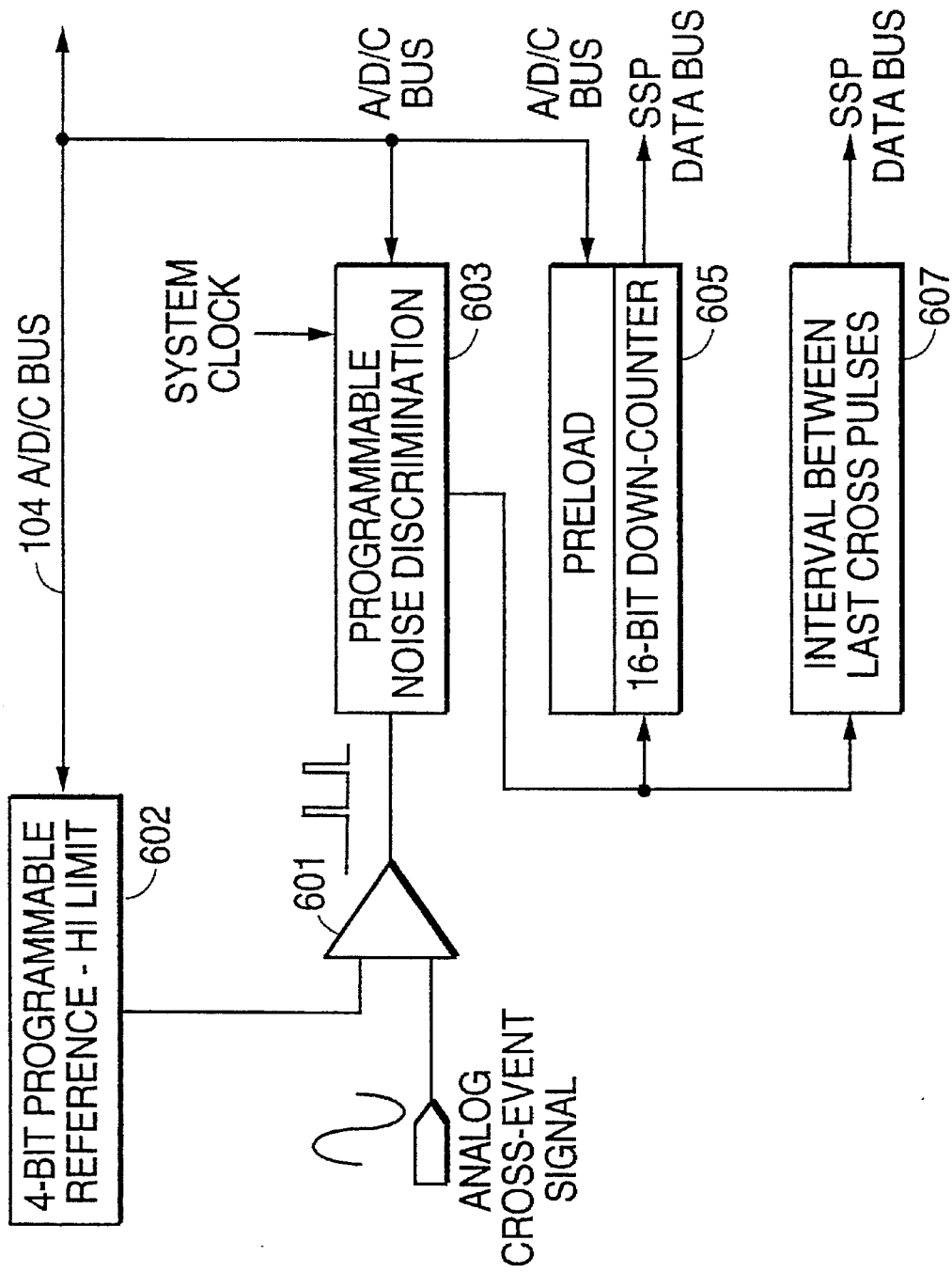
FIG. 6 is a block diagram of a pulse count/discrimination circuit.

The circuit in FIG. 6 mitigates the problem of calculating head/actuator feed forward current by maintaining a continuous, instantaneous measure of both signed distance to the destination track and the time in system clocks to cross the last track. Comparator 601 receives as an input an analog cross-event signal, in this case a position error signal, which will vary periodically with the radial crossing of tracks. This track crossing analog signal is compared to a programmable reference voltage high limit established in block 602. Assuming a 50 millivolt or higher overdrive of the reference signal, a digital output signal from comparator 601 can cycle at 5 MHz or higher.

The digital output signal from comparator 601 is applied to programmable noise discrimination circuit 603 in order to correct for noise in the cross-event signal. This is done by comparing the occurrence of a pulse to programmed minimum and maximum time intervals during which a pulse is expected. During acceleration of the head, pulses come at decreasing intervals, indicative of the increasing speed of the head/actuator assembly. The maximum time interval can be set to a previously observed interval plus a fixed offset. The minimum time interval can be set to the previously observed interval minus a fixed offset. Both time intervals are programmed in a register in programmable noise discrimination circuit 603 through microprocessor 102 over bus 104.

Thus, the discrimination window during which pulses are expected to appear has a programmable width and adaptively narrows and slides downward during acceleration and upward during deceleration. Given that the discrimination window is established, the circuit will output a single pulse during the window whether it receives 0, 1 or multiple pulses. If one or more pulses occur, the first one is taken as valid. If zero pulses occur, the appropriate limit will be used to generate a pulse.

The discriminated pulse signal is applied to the 16-bit preloadable down counter 605 and the interval between the last cross pulse circuit 607. At any given instant, down counter 605 can be read by the streamlined signal processor to obtain the number of tracks remaining to be crossed. This is the signed distance to the destination track. With each discriminated pulse signal, the interval between the last cross pulse is calculated in system clocks and is available for the streamlined signal processor to read as an output of interval circuit 607.

The above described architecture allows the user to employ the principle of "static scheduling," which is based on a thorough knowledge of the algorithm and the sequence in which it is to be executed. Essentially, an algorithm is mapped onto a space/time chart on a frame by frame basis. Each frame consists of a set of subroutines or microcode modules executing at particular instances in the frame. Therefore, the master microprocessor and the streamlined signal processors operate autonomously as long as interprocessor communication takes place at prescribed instances in the frame, for example, for data transfer or parameter passing between the processors.

In a system which can experience both scheduled and asynchronous events, the typical source of conflict is analog input/output resources. Priority is given to the streamlined signal processor into which a portion of the system has been statically scheduled, thereby preserving its synchronicity. The other streamlined signal processor is programmed to respond via the vector register mechanisms 214–220 to the asynchronous part of the system schedule.

As discussed above, the invention is particularly applicable to systems in which both static scheduled events and asynchronous events occur. One such system is an optical disk servo. An optical disk servo has two main modes of operation, the first being steady state track following and the second being track-to-track seek repositioning. In addition, a number of asynchronous events, such as the encountering of the automatic laser power calibration (ALPC) field on the disk, occur and require response within a fixed time.

In static scheduled track following, the primary goal is to maintain the critical servo loops closed and stable. The critical loops include focus, fine position, course position, read/write laser power, write magnet field strength, and spindle angular velocity. These can be mapped and programmed into a single streamlined signal processor and operation statically scheduled. The paging mechanism previously discussed allows a common lead/lag/integrator filter structure to be utilized by all the servo loops, thereby preserving instruction RAM space.

In order to evaluate timing considerations, the inventors determined that for a typical focus or position tracking loop in an optical disk servo, more than 75% of the time in the loop is spent calculating an infinite impulse response or similar type of filter function. It has been determined that a fourth order infinite impulse response filter can be implemented in as little as 21 machine cycles using the architecture described above. Assuming that an entire servo can be implemented in approximately 30 cycles, 4 such servos can be implemented in approximately 120 machine cycles. This can be achieved because of the parallelism previously discussed in the streamlined signal processor architecture and because of special function units that address system requirements, such as the safety circuits in the rapid limit comparator operation which shut down the write laser if tracking is lost, thereby protecting data on adjacent tracks and freeing the tracking servo loops from the necessity of performing this function.

At a 16 MHz clock rate a single streamlined signal processor would keep all the main servo loops closed while sampling the servo error signals at a rate of 130 KHz. At a spindle rotation of 7,200 RPM, a sample rate of 133 KHz translates to sampling each of the servo loops approximately 3 times in every degree of angular rotation. Current digital servo methods, applied at spindle rotation speeds of only 3,000–3,600 RPM, sample approximately 4 times less frequently per degree of rotation.

Thus, employing the above-described architecture, a single streamlined processor could adequately manage critical servo loops of current optical disk controllers with significant design margin. This frees the second streamlined signal processor to accelerate seek performance and accuracy through rapid calculation of actuator feed forward current and reliable radial velocity estimation.

The problem in seek operations is calculating the actuator drive current required to reposition the actuator in minimum time. The difficulties are that the instantaneous position and velocity during a seek trajectory produce noisy signals and upon completion of a seek, it is necessary to confirm reposition of the actuator. The first problem is mitigated by the circuitry shown in FIG. 6, which generates accurate track-cross event pulses and counting, and provides a mechanism to clean up noise in the track-cross signal, as discussed above. The circuitry uses a priori knowledge of the velocity profile to set a window of time in which track-cross events are expected to occur, rejects spurious signals outside this window, and limits events within the window to a single pulse.

An accurate estimate of radial velocity is also possible via the use of the second streamlined processor. The second streamlined signal processor can derive its frame-sync signal from track-crossing events and then calculate estimates of velocity and actuator drive current. A simple method is to use instantaneous velocity and tracks to be cross counts as parameters in a look up table, which can be supported by the streamlined signal processor.

The problem of confirming the correct repositioning of the actuator is mitigated with the control device 100 by the means for rapid identification of track position via the header port shown in FIG. 1b. Typically, header and sector information is asynchronously transferred to the header port RAM 152 as soon as it is available. The seek servo is then vectored to the appropriate slot in sequencer memory 206 through sequencer memory address counter 210 based on the information in vector registers 216 and 217. A subroutine can then perform and seek correction of velocity in position profile. Thus, all that is required is a data channel controller configured to write the information into header port RAM 152 and generate an appropriate trigger of the vector register.

Another example of an event which cannot be statically scheduled and exploits the vector register mechanism of the streamlined signal processor is encountering an ALPC media event. The ALPC event signals the beginning of a field used to calibrate laser power on an optical disk controller. Unlike servo error signals for statically scheduled portions of the system, which are continuously available, the ALPC event occurs only when the subject field passes under the optical head, and it must be rapidly processed. This can be accomplished in the architecture of the present invention.

During system initialization the microprocessor 102 loads a ALPC calibration subroutine into the streamlined signal processors instruction RAM, loads the start address of the ALPC subroutine into a slot in the streamlined signal processor's sequencer memory and the loads the address of this slot into the streamlined signal processor's EXT_0 vector register 216. When an external data channel controller detects the occurrence of the ALPC event, it pulses a trigger to cause the streamlined signal processor to execute the ALPC subroutine. Consequently, the calculation is performed and the appropriate laser power output is generated.

It will be apparent that numerous other applications of the above-described servo loop control architecture exist. The examples herein are given by way of illustration and not limitation. Using the architecture, after power up, the streamlined signal processors are dynamically loaded with their programs and timing is set up to start their operation. The instructions of the streamlined signal processors can be loaded through input/output space of the master processor 102 or under direct program control or via direct memory access (DMA) techniques. It should also be noted that external control of the master microprocessor bus 104 can be effected by placing master microprocessor 102 in a hold condition and allowing computational elements outside control apparatus 100 to access all of its internal blocks via bus 104. It will also be known by those of ordinary skill that any digital processor or combination of processors and logic can be used to implement the disclosed architecture.

What is claimed is:

1. A servo loop control apparatus comprising:
   input circuitry arranged to receive signals from a servo loop to be controlled;
   output circuitry arranged to provide signals to a servo loop to be controlled;
   a master processor to control said apparatus, said master processor being connected via a bus to a memory and having write access at any time to any location in a first portion of said memory and read access at any time to any location in said first portion and a second portion of said memory;
   a second processor, said second processor communicatively coupled to at least one of said input and said output circuitry and programmed to operate autonomously of said master processor, said second processor being dedicated to specific, pre-programmed servo loop control tasks and being connected to said memory with write access at any time to any location in said second portion of said memory and read access to any location in said first and second portions of said memory, said second processor comprises means for executing repetitive preprogrammed servo loop processing instructions without interruption, thereby maintaining operation of a servo loop independent of said master processor; and
   a plurality of vector registers, said vector registers forming a means for interrupting said servo loop processing in said second processor under a limited set of predefined conditions;
   wherein said at least one of said input circuitry and said output circuitry are controlled by said master processor and said second processor through said memory.

2. The apparatus recited in claim 1, further comprising an instruction RAM for access by said second processor, said instruction RAM storing instructions for user defined servo control loop routines.

3. The apparatus recited in claim 2, further comprising a memory accessible by said second processor while executing said instructions, said memory storing for access at least one of a subroutine and a variable parameter used by said user defined servo control loop routines.

4. The apparatus recited in claim 1, further comprising an instruction ROM for access by said second processor, said instruction ROM storing instructions for predefined turn-key routines and used controlling a servo loop.

5. The apparatus recited in claim 3, further comprising a memory accessible by said second processor while executing said instructions, said memory storing for access at least one of a subroutine and a variable parameter used by said turn-key routines.

6. The apparatus recited in claim 5, comprising programmable means for allocating priority of access to said input and output circuitry to said second processor, thereby preserving synchronicity of said second processor task.

7. The apparatus recited in claim 1, further comprising a third processor, said third processor being interruptable to handle asynchronous servo loop events.

8. The apparatus recited in claim 1, wherein said input circuitry comprises a multiplexer receiving inputs on a plurality of separate channels, said multiplexer having an output periodically outputting a signal from each channel in a predetermined sequence, thereby maintaining freshly updated data for each channel on said output.

9. The apparatus recited in claim 6 wherein said multiplexer has means responsive to said second processor for interrupting said predetermined sequence and for outputting a signal for a particular channel requested by said second processor.

10. A servo loop control apparatus as recited in claim 1, wherein said master processor and said second processor write data to said first and second portions of said memory, respectively, without latency.

11. A servo loop control apparatus as recited in claim 1, wherein said master processor receives data from said second processor by reading from said second portion of said memory and said second processor receives data from said master processor by reading from said first portion of said memory.

12. A method of servo loop control, the method comprising the steps of:

receiving into input circuits signals from a servo loop to be controlled;

through output circuitry providing signals to a servo loop to be controlled;

executing overall control of said servo loop with a master processor via a bus to a memory;

operating a second processor, connected to said bus and communicatively coupled to at least one of said input circuits and said output circuitry, autonomously of said master processor and dedicating said second processor to specific, pre-programmed servo loop control tasks;

executing in said second processor repetitive preprogrammed servo loop processing instructions without interruption, thereby maintaining operation of a servo loop independent of said master processor;

interrupting said servo loop processing in said second processor under a limited set of predefined conditions through a plurality of servo registers; and controlling said input circuitry and said output circuitry by said master processor and said second processor through a memory having a first portion and a second portion, said master processor at any time having access to write data to said first portion of said memory and to read data from said first portion and said second portion of said memory, said second processor at any time having access to write data to said second portion of said memory and to read data from both said first and said second portions of said memory.

13. The method recited in claim 12, further comprising storing instructions for user defined servo control loop routines in an instruction RAM for access by said second processor.

14. The method recited in claim 13, further comprising storing for access at least one of a subroutine and a variable parameter used by said user defined servo control loop routines in a memory accessible by said second processor while executing instructions.

15. The method recited in claim 12, further comprising storing instructions for predefined turn-key routines used in controlling a servo loop in an instruction ROM for access by said second processor.

16. The method recited in claim 15, further comprising storing for access at least one of a subroutine and a variable parameter used by said turn-key routines in a memory accessible by said second processor while executing said instructions.

17. The method recited in claim 12, further comprising processing asynchronous servo loop events with a third processor interruptable to handle said asynchronous servo loop events.

18. The method recited in claim 17, comprising allocating priority of access to said input and output circuitry to said second processor, thereby preserving synchronicity of said second processor task.

19. The method recited in claim 12, comprising receiving inputs on a plurality of separate channels of a multiplexer and periodically outputting and accessing a signal from each channel in a predetermined sequence, thereby maintaining freshly updated data for each channel on said output.

20. The method recited in claim 19, wherein responsive to said second processor, said multiplexer interrupts said predetermined sequence and outputs a signal for a particular channel requested by said second processor.

21. The method recited in claim 12, wherein said master processor and said second processor write data to said first and second portions of said memory, respectively, without latency.

22. The method recited in claim 12, wherein said master processor receives data from said second processor by reading from said second portion of said memory and said second processor receives data from said master processor by reading from said first portion of said memory.

* * * * *